United States Patent

[11] 3,603,993

| [72] | Inventors | Robert J. Follen<br>Minneapolis;<br>Charles P. Harman, Jr., St. Paul; Jackie R. Meyer, Columbia Heights, all of, Minn. |
|---|---|---|
| [21] | Appl. No. | 861,244 |
| [22] | Filed | Sept. 26, 1969 |
| [45] | Patented | Sept. 7, 1971 |
| [73] | Assignee | Honeywell Inc.<br>Minneapolis, Minn. |

[54] CONTROL APPARATUS
5 Claims, 4 Drawing Figs.

[52] U.S. Cl. .................................................. 343/6.5 LC, 343/6.8 LC
[51] Int. Cl. ................................................................ G01s 9/56
[50] Field of Search ........................................... 343/6.5, 6.5 LC, 6.8, 6.8 LC

[56] References Cited
UNITED STATES PATENTS

| 3,035,260 | 5/1962 | Freedman et al. ............. | 343/6.5 |
| 3,035,261 | 5/1962 | Vielle ............................ | 343/6.5 |
| 3,493,968 | 2/1970 | Shear et al. .................... | 343/6.5 LC |

*Primary Examiner*—Malcolm F. Hubler
*Attorneys*—Charles J. Ungemach, Ronald T. Reiling and James A. Phillips

ABSTRACT: A cooperative proximity warning system wherein interrogation signals from interrogating aircraft are modulated to scan the bands of altitude adjacent the altitude of the interrogator as well as the altitude of the interrogator and responses to the interrogations occur when the altitude of a responding aircraft coincides with the altitude information contained in a received interrogation signal.

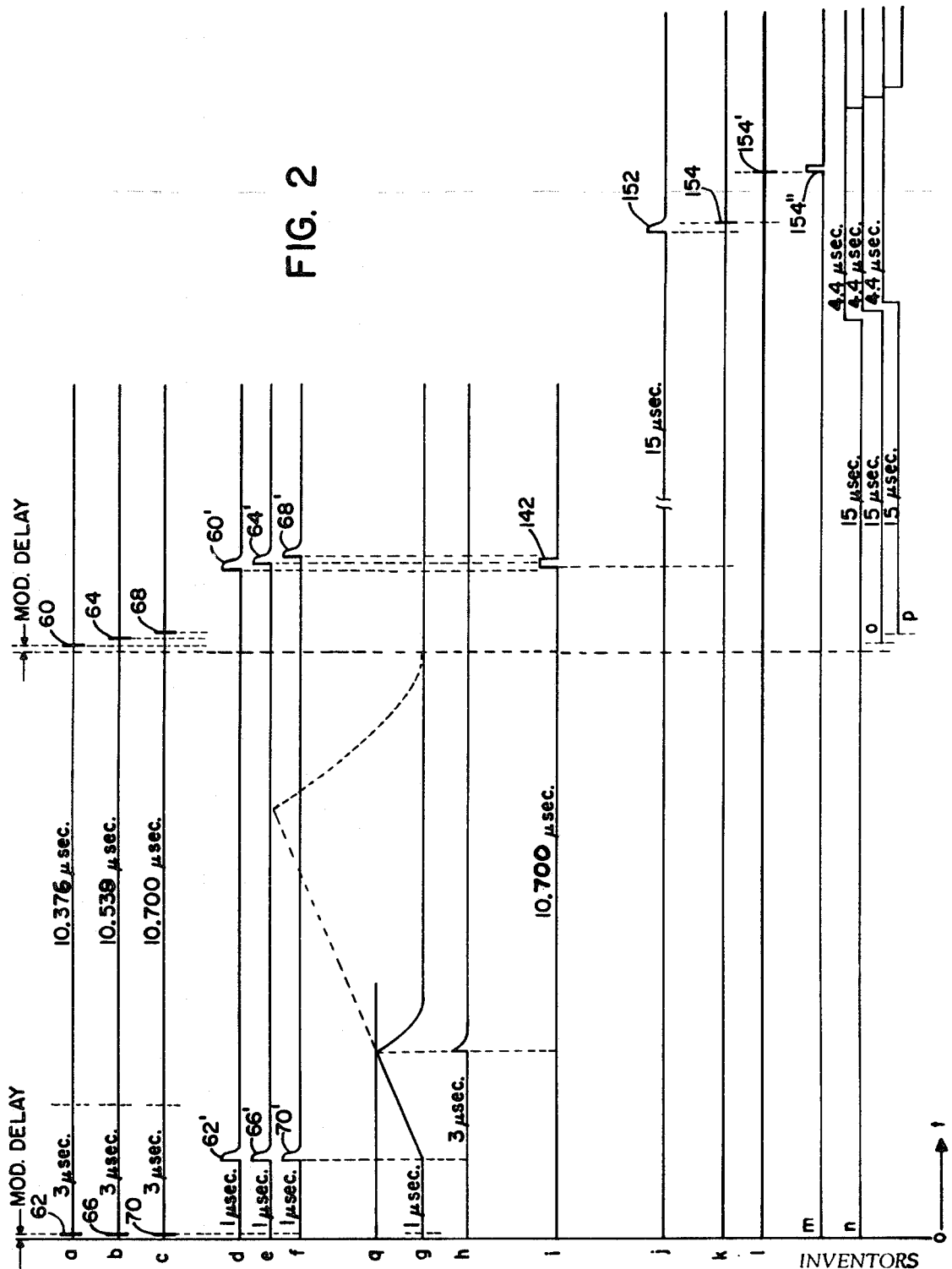

CONTROL APPARATUS

BACKGROUND

The invention falls within the general field of radio wave communications and more particularly is an interrogator-responder system for use on helicopters (or other aircraft) to provide proximity warning.

SUMMARY

The invention includes an interrogator-transponder unit for installation on helicopters. An interrogator-helicopter periodically transmits pairs of pulsed signals which correspond to its altitude and adjacent bands of altitude. A receiver on the interrogating helicopter is gated to receive responses only from those helicopters responding to the interrogations which are within a predetermined selectable range. A responder-helicopter when interrogated, generates a pulse signal representing its altitude. If this signal coincides in time with the signal received from the interrogator-helicopter, a pulsed signal is transmitted back to it. If the response signal is from a helicopter within the range scanned by the interrogator-helicopter an appropriate warning is given and the relative altitude (above, equal, or below) of the responder-helicopter is indicated.

DESCRIPTION OF THE DRAWINGS

FIGS. 2a through 2q form a timing chart of the operation of the proximity warning apparatus.

DESCRIPTION OF THE APPARATUS

Figure 1A:
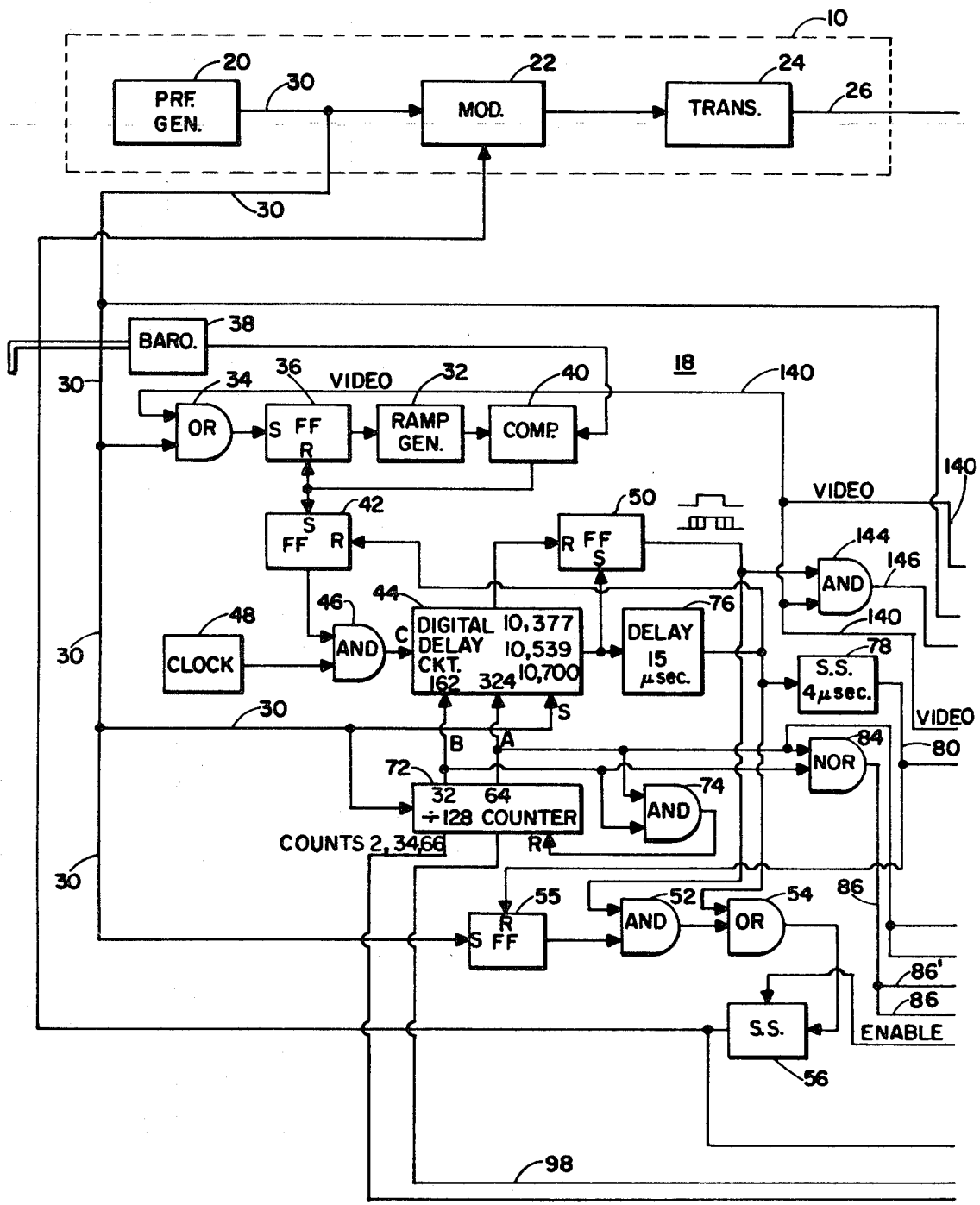
FIGS. 1a and 1b form a single functional block diagram of a proximity warning apparatus.
Figure 1B:
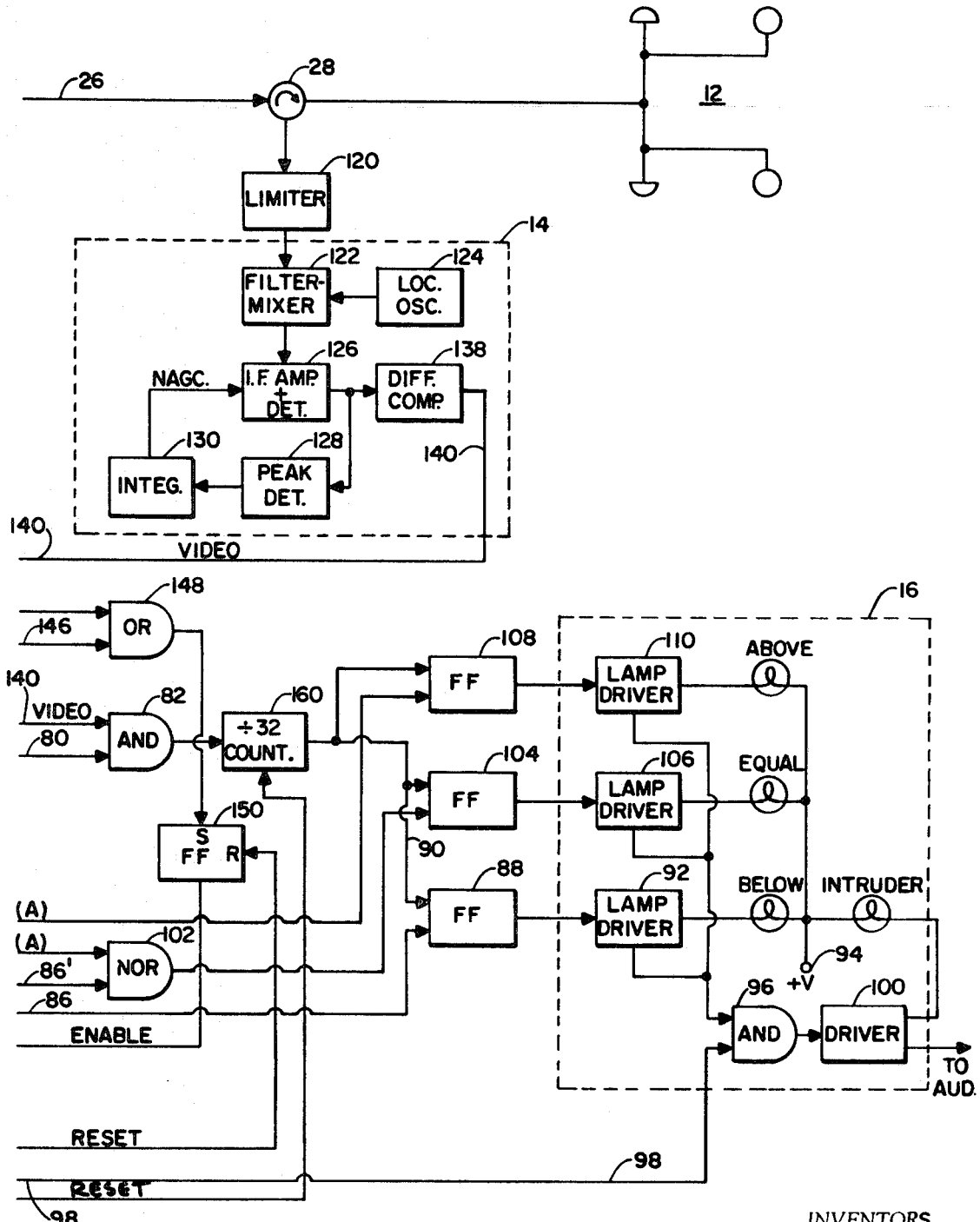

FIGS. 1a and 1b taken together make up a block diagram of a proximity warning apparatus comprising a transmitter unit 10, an antenna 12, a receiver 14, an indicator 16, and a digital signal processor 18. A system such as this is installed on each helicopter (or other aircraft) which is to be given proximity warning information. The system, therefore, is said to be a cooperative one.

On an interrogating (as opposed to a responding) helicopter a PRF generator 20 initiates an interrogation cycle by energizing a modulator 22 which fires a transmitter 24. Modulator 22 has an inherent delay which typically is about 400 nanoseconds. Generator 20, for example, has a PRF of about 100 cycles per second, is free-running, and is dithered (noise modulated) over a ±10 percent range to prevent possible coincidence with PRF generators on other like equipped helicopters. Transmitter 24 emits narrow RF pulses which, for example, are about 50 nanoseconds wide and have a peak power of about 100 watts. Transmitter 24 may be a pulsed, tuned cavity power oscillator operating at about 5.08 gigaHertz. Pulsing the power oscillator causes RF output pulses to be generated. The RF pulses generated by transmitter 24, present on a line 26, pass through a ferrite circulator 28 to antenna 12. Antenna 12 comprises two quarter-wave stubs. An antenna with one stub may be adequate in many instances if the transmission is substantially omnidirectional.

The output pulses of PRF generator 20, present on a line 30, also initiate an analog ramp generator 32 within the digital signal processor 18. The action of ramp generator 32 is initiated when a pulse from PRF generator 20 passes through OR gate 34 and sets a flip-flop 36. When flip-flop 36 is set, ramp generator 32 begins developing a linear voltage ramp. The ramp generator signal represents an altitude of +7,000 feet at 0 microseconds which changes linearly to an altitude of −1,000 feet at 8 microseconds. Thus, the delay corresponding to a 4,000-foot altitude is 3 microseconds. The output of ramp generator 32 is compared with the output of a baro transducer 38 in a voltage comparator 40. The output of baro transducer 38 is a voltage which is inversely proportional to altitude. Note that the ramp generator may be designed to have an output which represents an increasing altitude with time and transducer 38 may be designed to generate a signal which is directly proportional to altitude.

The output of comparator 40 is a pulse delayed from that of PRF generator 20 by a time inversely proportional to the altitude of the interrogating helicopter. The output pulse of comparator 40 resets flip-flop 36 and sets another flip-flop 42. When flip-flop 36 is reset the output voltage of ramp generator 32 rapidly drops to zero and remains in that condition until the next pulse from PRF generator 20 or a video signal passes through OR gate 34.

A digital delay circuit 44 is initiated when flip-flop 42 is set. The setting of flip-flop 42 enables an AND gate 46 so that the signal from a crystal controlled clock 48 passes through AND gate 46 and is applied to the digital delay circuit 44. In this case the clock signal was selected to be 49 megahertz. Digital delay circuit 44 develops an output pulse either 10.377, 10.539, or 10.700 microseconds later depending upon the amount of presetting applied to it. Digital delay circuit 44 in effect is a counter which can be preset. The output of digital delay circuit 44 sets a flip-flop 50 which is reset 250 nanoseconds later by another pulse from circuit 44. The resulting pulse develops by flip-flop 50 passes through an enabled AND gate 52 and an OR gate 54 and is applied to a single-shot (or one-shot) multivibrator 56. AND gate 52 is enabled by a flip-flop 55 which is set by pulses from PRF generator 20. Multivibrator 56 generates a narrow pulse which is applied to modulator 22. The trailing edge of this pulse energizes modulator 22, which causes transmitter 24 to be fired again, producing the second pulse of the interrogation code.

Referring to FIG. 2a, the second pulse 60 is shown delayed from the first pulse 62 by a time (3 microseconds) which is inversely proportional to the altitude (4,000 feet) of the interrogating helicopter plus a fixed time of 10.700−0.162−0.162= 10.376 microseconds. In this example, then, the total delay is 13.376 microseconds. This time spacing is maintained and pulse pairs (first and second pulses) are transmitted at a PRF of 100 ±10 cycles per second for a period of about one-third second. At the end of the first ⅓-second interval 162 nanoseconds of delay is preset or inserted into digital delay circuit 44. This results in a series of pulses as shown in FIG. 2b, where the second pulse 64 is delayed from the first pulse 66 by a total of 13.700−0.162=13.538 microseconds. This spacing is maintained for a second interval of about one-third second. At the end of the second ⅓-second interval no delay is preset into digital delay circuit 44 and this condition is maintained for about one-third second. This results in a series of pulse pairs as shown in FIG. 2c where the second pulse 68 is delayed from the first pulse 70 by 13.700 microseconds. This sequence of events represented by FIGS. 2a, 2b, and 2c, which may be called time multiplexing, is the repeated.

The preset delays of 162 and 324 nanoseconds preset into digital delay circuit 44, which has a basic delay of 10.700 microseconds, are controlled by a counter 72, which has seven binary stages and therefore is denoted as a divide by 128 counter. Counter 72 presets digital delay circuit 44 to either 0, 162, or 324 nanoseconds of delay before the basic counting sequence in circuit 44 is started. The pulses from PRF generator 20 set digital delay circuit 44 and are counted in counter 72. For the first 31 interrogation cycles (about one-third second) there is no output from counter 72 and therefore a presetting of 324 nanoseconds occurs in circuit 44. Beginning with interrogation cycle 32 and ending with interrogation cycle 63, counter 72 provides a signal B which results in a presetting of 162 nanoseconds in circuit 44. Beginning with interrogation cycle 64 and ending with interrogation cycle 96, counter 72 provides a signal A which results in no presetting of circuit 44. During interrogation cycle 96 signals A and B are both present and pass through an AND gate 74 to reset counter 72 and ready it for the next counting sequence. In this way for each sequence of 96 interrogation cycles the preset delay during the first third of the sequence is 324 nanoseconds, during the second third of the sequence is 162 nanoseconds, and during the last third of the sequence is 0 nanoseconds.

This changing of delays during the interrogation mode of operation provides means for discriminating between responding helicopters which are above, below, or equal to the altitude of the interrogating helicopter.

The output of digital delay circuit 44 is also applied to a 15-microsecond delay circuit 76, the output of which fires a single-shot multivibrator 78. Multivibrator 78 generates a 4.4-microsecond pulse, present on a line 80, which is applied to an AND gate 82, enabling it. Of the 4.4-microsecond width, 0.4 microseconds of it is to compensate for the inherent delay in modulator 22. The 4.4-microsecond output pulse of multivibrator 78 is referred to as the range gate and is delayed 15 microseconds from the generation of the second pulse of a pair of interrogating pulses. The 4.4-microsecond width of the range gate in this case corresponds to an interrogation range of 2,000 feet. Changing the width of the range gate changes the interrogation range. For example by changing the width to 2.4 microseconds or 6.4 microseconds, the interrogation range becomes 1,000 feet or 3,000 feet, respectively. Therefore the interrogation range can be made selectable by providing a variable multivibrator 78.

During the interrogation mode the digital signal processor 18, by means of the output signals from counter 72 and associated logic circuitry, controls which of three alarm memory circuits is activated or enabled. When the interrogation pulse spacing signifies an interrogation for proximate helicopters at an altitude 300 feet below that of the interrogator (corresponding to a 0-nanosecond preset delay to digital delay circuit 44) neither signal A nor signal B is present at the output of counter 72. A NOR gate 84 is connected to the lines normally carrying the A and B signals and in the absence of both signals generates an output signal on a line 86 which enables a flip-flop 88. When flip-flop 88 also receives a signal via a line 90 it sets and energizes a lamp driver 92. Energizing lamp driver 92 places a BELOW indicator lamp in series with a +V voltage source 94. In addition lamp driver 92 provides an enable signal to an AND gate 96 which also receives a three cycle per second signal, on a line 98, generated by counter 72. This three cycle per second signal passes through AND gate 96, when it is enabled, and is applied to a driver 100. Driver 100 generates one signal which is applied to an audio device (not shown) and a second signal which is used to periodically place an INTRUDER indicator lamp in series with the +V voltage source 94. Thus when the proximate helicopter (intruder) is detected the BELOW indicator lamp is energized constantly and the INTRUDER indicator lamp is energized in a flashing mode to attract the attention of the pilot.

Assume now that counter 72 is putting out a 162-nanosecond preset delay signal B which corresponds to an interrogation for intruder helicopters at an altitude equal to that of the interrogating helicopter. The A signal line of counter 72 and the output line 86 of NOR gate 84 are connected to another NOR gate 102. Because signal A is not preset and because there is no output from NOR gate 84, NOR gate 102 generates an output signal which enables flip-flop 104. When flip-flop 104 receives a signal from line 90 it sets and provides an output signal which energizes a lamp driver 106 which is associated with an EQUAL indicator lamp and AND gate 96 in a manner corresponding to that of lamp driver 92.

Now assume that counter 72 is putting out a 324-nanosecond preset delay signal A which corresponds to an interrogation for intruder helicopters at an altitude 300 feet above that of the interrogating helicopter. In this case the A signal line is connected directly to a flip-flop 108 which is enabled when signal A is present. When flip-flop 108 receives a signal from line 90 it sets and energizes a lamp driver 110 which is associated with an ABOVE indicator lamp and AND gate 96 in a manner corresponding to that of lamp drivers 92 and 106.

Thus depending on the output of counter 72 one of three alarm channels is enabled. An alarm channel serves to drive the appropriate indicator lamp and performs a memory function (of about 1 second) which maintains a given intruder alarm condition while the system cycles through its ⅓-second interrogation subcycles. Flip-flops 88, 014, and 108 are "D"-type flip-flops with "D" inputs connected to line 90 and clocking signals connected to the other inputs. The clocking occurs only at the end of the 32, 64, and 96 counts in counter 72. A divide by 32 counter 160 is reset two counts later. Flip-flops 88, 104, and 108 act to hold an alarm or no alarm condition until the next time they are clocked.

In summary, then, each interrogation consists of two pulses occurring at a PRF of 100 pairs of pulses per second. The pulses are relatively narrow, about 50 nanoseconds, and have a peak power of about 100 watts each. The two pulses in a pair are separated by a time delay inversely proportional to the baro altitude of the interrogating helicopter plus one of three possible fixed time delays of 10.376, 10.538, or 10.700 microseconds. The fixed delay is sequenced or stepped through the three passible values at a rate of 1 complete cycle per second. Providing different delays enables an interrogating helicopter to discriminate between intruder helicopters which are 100 to 300 feet above, 100 to 300 feet below, or approximately equal to the altitude of the interrogating helicopter. The fixed delay provides a minimum of 10.376 microseconds between pulses of an interrogation pair which allows operation to zero range differential and eliminates the effects of multiple path signals. A range gate is positioned to allow reception of replies from responding helicopters within a range of 3,000 feet. The range gate is delayed an additional fixed amount of 15 microseconds from the second pulse of an interrogation pair to eliminate the possibility of an interrogator receiving and processing its own ground returns. Lastly, the appropriate alarm channel is enabled.

The range gates associated with pulses 60, 64 and 68 are shown in FIGS. 2n, 2o, 2p respectively. The range gates occurs 15 microseconds after the second pulse of an interrogating pulse pair.

The interrogation mode of operation has been described and the response mode of operation will now be described. Although two separate systems like the one shown in FIGS. 1a and 1b are necessary, one on the interrogating helicopter and one on the responding helicopter, the same system will be used here to explain the response mode of operation in the responding helicopter.

Antenna 12 provides omnidirectional coverage for the reception of the single frequency, 5.08 gigaHertz interrogation signal. Receiver 14 is a broadband superhet which minimizes the need for frequency stability, therefore eliminating the need for any active form of automatic frequency control. Signals received by antenna 12 pass through ferrite circulator 28 and a limiter 120 and are applied to a composite RF filter/balanced mixer 122. The output of a local oscillator 124 is also applied to filter/mixer 122. The intermediate-frequency (IF) signal out of filter/mixer 122 is applied to an IF amplifier which in turn drives a full-wave detector. Both the IF amplifier and the full-wave detector are shown in a single block 126. A peak detector 128 and a series integrator 130 provide a noise automatic gain control (NAGC) feedback signal around the IF amplifier and full-wave detector 126. The NAGC essentially maintains an optimum noise level with respect to a fixed threshold regardless of a drift in gain of the IF amplifier 126 or changes in the noise level. Video pulses at the output of full-wave detector 126 which exceed a fixed threshold pass through a differential comparator 138. In this particular system, where sensitivity is not a problem, a sizeable signal/noise ratio (of about 14 db.) is required for the input signal to reach a fixed threshold. This decreases the probability of false alarms.

The video signal output of differential comparator 138, present on a line 140, passes through OR gate 34 and initiates the operation of ramp generator 32 in the same way as pulse from PRF generator 20. The video pulses are shown as pulses 62', 66', and 70' in FIGS. 2d, 2e, and 2f respectively. These pulses correspond to the transmitted pulses 62, 66 and 70 shown in FIGS. 2a, 2b and 2c, delayed by 2 microseconds which corresponds to a range of 1,000 feet between the interrogating and the responding helicopters.

Figure 3:
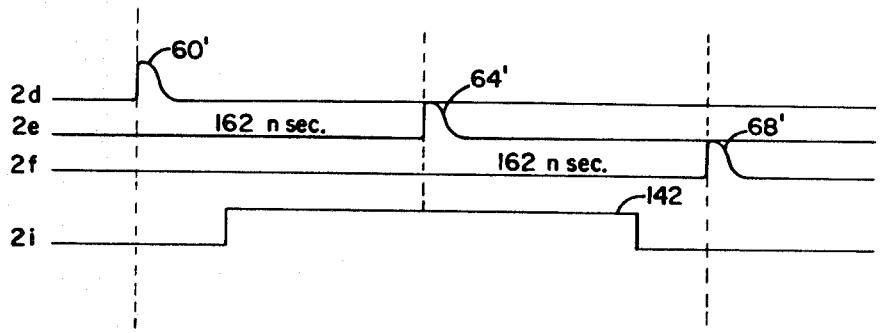
FIG. 3 is an enlarged portion of the timing chart of FIG. 2.

The output voltage of baro transducer 38, representing the altitude of the responding helicopter, shown by FIG. 2q, is compared with the output voltage of ramp generator 32, shown by FIG. 2g, in comparator 40 which produces an output pulse, shown by FIG. 2h, when there is coincidence. Assuming the responding helicopter is also at an altitude of 4,000 feet the ramp generator 32 introduces a delay of 3 microseconds. The output of comparator 40 activates digital delay circuit 44 which introduces an additional 10.700 microseconds of delay and then generates an altitude acceptance gate signal 142 which is shown by FIG. 2i. The altitude acceptance gate signal 142 is applied to one input of an AND gate 144 and the video signal, on line 140, is applied to the other input of AND gate 144. AND gate 144 detects the coincidence of the altitude acceptance gate signal 142 and the video signals 60', 64' and 68' shown in FIGS. 2d, 2e, and 2f. The position of the altitude acceptance gate signal 142 is dependent upon the altitude of the responding helicopter which has been assumed to be the same as that of the interrogating helicopter. Thus the video pulse 64' is centered with respect to the altitude acceptance gate signal 142. This is more clearly shown in FIG. 3 which is an enlarged portion f and 2i. In other words, the FIGS. 2d, 2e, 2f and 2i. In other words, the coincidence of the altitude acceptance gate signal 142 and the incoming video signals will occur at AND gate 144 when interrogations are being made with respect to any helicopters having an equal altitude. The output of AND gate 144, on line 146, passes through an OR gate 148 and sets a flip-flop 150 which enables single-shot multivibrator 56. Multivibrator 56 generates a 275-nanosecond wide command pulse 152 15 microseconds later, the trailing edge of which energizes modulator 22 which fires transmitter 24. The command pulse 152 is shown in FIG. 2j. The firing of transmitter 24 results in a pulse 154 shown in FIG. 2k which is received 1 microsecond later by the receiver in the interrogating helicopter. The received pulse is shown as pulse 154' in FIG. 2l. The output of the receiver in the interrogating helicopter is shown as pulse 154'' in FIG. 2m and is within the 4.4-microsecond altitude gate shown in FIG. 2o. In other words, there is coincidence at AND gate 82. AND gate 82 passes coincident video pulses and applies them to the divide by 32 counter 160. If 16 such pulses are applied to counter 160 during a ⅓-second interrogation subcycle it will generate a pulse and apply it to flip-flops 88, 104, and 108. Flip-flop 104 has been enabled earlier because interrogation has been assumed to be for equal altitude intruder helicopters and hence the EQUAL indicator lamp will be energized by its associated driver.

The same process is repeated for interrogations for helicopters intruding above and below the interrogating helicopter. A response is generated by an intruding helicopter only if there is coincidence between its altitude acceptance gate signal and an interrogation video signal. From FIG. 3 it can be seen that the altitude acceptance gate signal 142 can overlap only a single interrogation video pulse such as pulse 64' as shown, or gate signal 142 can overlap any two adjacent interrogation video pulses such as pulses 60' and 64' or pulses 64' and 68'. Because of the memory function incorporated in the alarm channels it is possible to have two adjacent indicator lamps on simultaneously. Thus the ABOVE and EQUAL lamps or the EQUAL and BELOW lamps can be on at the same time. In the example used in describing the invention only the EQUAL lamp is on. The width of the altitude acceptance gate 142 is about 228 nanoseconds wide whereas the spacing between interrogation video pulses is only 162 nanoseconds. The system is designed such that if the helicopters are separated by less than 50 feet in altitude, only the EQUAL lamps will be on in each helicopter. If the altitude of the interrogating helicopter is from 50 to 165 feet below that of the responding helicopter the EQUAL and ABOVE lamps will be on in the interrogating helicopter. The EQUAL and BELOW lamps will be on if the altitude of the interrogating helicopter is from 50 to 165 feet above that of the responding helicopter. If the altitude difference between an interrogating and a responding helicopter is between 165 feet to 300 feet, only the ABOVE or BELOW lamp will be on, whichever is appropriate.

In the response mode of operation a response to an interrogation occurs only if the altitude of the interrogator is within about 300 feet of that of the responder.

It is to be understood that this description is illustrative of the application of the principles of the invention. Many of the specific parameters referred to such as, the PRF, various delays, etc. can be changed depending upon the particular situation.

What is claimed is:

1. Aircraft proximity warning apparatus comprising:
   means carried by an interrogator aircraft for transmitting to a responder aircraft a pair of pulsed signals, the time delay between said pair of pulse signals comprising first and second time periods. the first time period continuously variable as a function of the altitude of the interrogator aircraft, the second time period discontinuously and periodically variable as a function which represents bands of altitude adjacent the altitude of the interrogator aircraft which are to be interrogated;
   means carried by said responder aircraft for receiving said pulsed signals and in response to the first pulse of a pair of pulsed signals developing a delayed gate signal, the delay comprising first and second time periods, the first time period representing the altitude of the responder aircraft, the second time period being fixed;
   means carried by said responder aircraft for transmitting to the interrogator aircraft a single pulsed signal if said delayed gate signal and the second pulse of a pulsed pair transmitted from the interrogator aircraft coincide;
   means on said interrogator aircraft for receiving said single pulsed signal transmitted by the responder aircraft, and
   indicating means on said transponder aircraft which responds to the single pulsed signals transmitted by the responder aircraft that are received during a predetermined variable time after the transmission of a pair of pulsed signals from the interrogator aircraft, the predetermined time representing a preselected interrogation range.

2. The apparatus of claim 1 wherein the first-named means comprises:
   an RF transmitter;
   a pulse modulator for modulating said transmitter;
   a PRF generator, developing a series of periodic pulsed signals which energize said pulse modulator;
   a ramp generator which generates a ramplike output signal which begins with each pulse out of the PRF generator;
   a baro transducer generating an output signal which is a function of the altitude of the interrogator aircraft;
   a comparator for comparing the signals out of the ramp generator and the baro transducer and generating a pulsed signal when the two signals are equivalent;
   a source of clock pulses;
   a digital counter;
   means for applying the clock pulses to the counter when the comparator generates a pulsed signal, the clock pulses being applied to the counter until it is full at which time it generates an output pulse which causes said pulse modulator to again be energized; and,
   means for periodically presetting said counter.

3. The apparatus of claim 2 wherein the ramplike output signal of the ramp generator corresponds to a decreasing altitude with increasing time and the output signal of the baro transducer varies inversely with altitude.

4. The apparatus of claim 2 wherein the ramplike output signal of the ramp generator corresponds to an increasing altitude with increasing time and the output signal of the baro transducer varies directly with altitude.

5. The apparatus of claim 1 wherein the indicating means comprises one alarm channel associated with the altitude of the interrogator aircraft and one alarm channel associated with each adjacent band of altitude interrogated;

means for sequentially enabling individual alarm channels synchronously with the variations in the second time period between pairs of pulsed signals transmitted from the interrogator aircraft, an enabled alarm channel being energized when a predetermined number of signals are received from the responder aircraft during a predetermined time.